United States Patent

[11] 3,599,837

[72] Inventor Douglas W. Anderson
 Palatine, Ill.
[21] Appl. No. 831,140
[22] Filed June 6, 1969
[45] Patented Aug. 17, 1971
[73] Assignee Dave Chapman, Goldsmith & Yamosaki, Inc.
 Chicago, Ill.

[54] PLASTIC DISPENSING CONTAINER AND CLOSURE THEREFOR
 10 Claims, 5 Drawing Figs.

[52] U.S. Cl. .................................................. 222/107
[51] Int. Cl. .................................................. B65d 35/08
[50] Field of Search .................................... 222/107, 206

[56] References Cited
UNITED STATES PATENTS
| | | | |
|---|---|---|---|
| 3,295,725 | 1/1967 | Brandt | 222/107 |
| 3,465,917 | 9/1969 | Saeki | 222/107 |

Primary Examiner—Stanley H. Tollberg
Attorney—Fidler, Bradley, Patnaude & Lazo

ABSTRACT: A squeezable-type collapsible container and a method of making it includes a molded nylon nozzle and shoulder part having an ethyl vinyl acetate plastic band injection molded directly onto and around a skirt portion thereof. A tube having a polyethylene inner surface is fitted over the band and a heat seal is effected between the band and the adjoining wall of the tube to fixedly secure the tube to the nylon part.

PATENTED AUG 17 1971  3,599,837

INVENTOR.
DOUGLAS W. ANDERSON

BY Fidler, Bradley & Outcault
ATT'YS

PLASTIC DISPENSING CONTAINER AND CLOSURE THEREFOR

The present invention relates to containers and plastic closures therefor, and it also relates to a novel method of making such closures and containers.

Collapsible containers such as squeezable tubes find many applications in the handling and dispensing of liquids and pasty substances such, for example, as purees, toothpastes, hair dressings, and the like. In the past, such containers or tubes were made of various soft metals such as lead and aluminum, but more recently, plastics with their attendant advantages have been used both for the tubular portion of such containers and for the closure or shoulder member at the dispensing end of such containers.

However, in spite of their lower weight, reduced cost, and aesthetic appeal, plastics have not found universal application for use in such containers. One important reason is that many of the plastics which are otherwise adaptable for this purpose are permeable to certain materials or ingredients in the materials to be packaged in such containers. For example, certain toothpastes cannot be packaged in containers using polyethylene closures without a noticeable change in the taste of the toothpaste due to absorption of the flavoring materials by the plastic. There are, however, some plastics, such as nylon, which are substantially impermeable to many of the materials which have not heretofore been satisfactorily packaged in plastic-type collapsible containers. These plastics have not found wide use in such containers, however, because of the difficulty encountered in sealing them to other plastic materials commonly used in the tubular flexible portion of the container.

Multiple-ply flexible materials for use as the tubular collapsible portion of such containers have been developed, but since they have polyethylene outer surfaces they have not found use with nylon closures because of the sealing problem. Yet, nylon is one of the few plastic materials from which such closures can be manufactured and still provide the necessary impermeability to the packaged contents of the container.

An object of the present invention is, therefore, to provide a new and improved flexible or collapsible container.

Another object of the present invention is to provide a new and improved nylon closure which can be heat-sealed to a polyethylene surface of a container.

Another object of the present invention is to provide a new and improved closure for a container.

A further object of the invention is to provide a new and improved method of manufacturing a closure in a container.

Briefly, the above and further objects may be realized in accordance with the present invention by molding a closure member having a nozzle therein of a first plastic material such as nylon, thereafter injection molding a band of another plastic material such as polyethylene directly onto and imbedded in a recess in said nylon to fixedly secure said band thereto while maintaining the outside diameter of the band within close tolerances, inserting the portion of the closure on which the band is molded into a tube having an inner surface formed of a plastic heat sealable to the band, and then heat sealing the tube to the band thereby to sealably secure the closure over one end of the tube.

Further objects and advantages and a better understanding of the present invention may be had by reference to the following detailed description taken in connection with the accompanying drawing, wherein.

Figure 1:
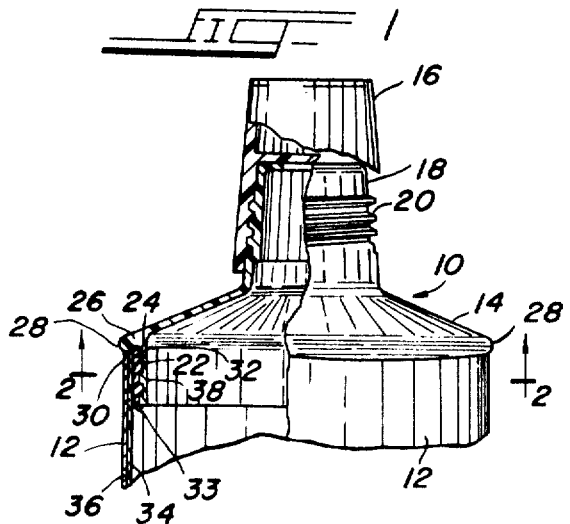
FIG. 1 is a fragmentary, partially sectioned view of a container embodying the present invention.
Figure 2:
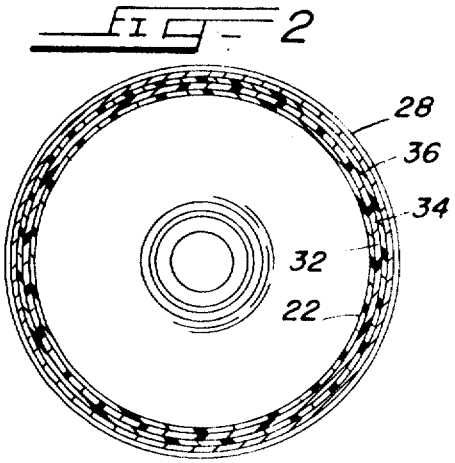
FIG. 2 is a sectional view taken along the line 2–2 of FIG. 1, assuming the entire device to be shown therein.

Referring now to the drawing and particularly to FIGS. 1 and 2 thereof, there is illustrated the upper portion of a squeezable tubular container 10 consisting of a flexible tubular member 12, a nozzle and shoulder member 14 which is sealed to one end of the tube 12 and a cap 16 threadedly secured to the nozzle and shoulder member 14.

The member 14 is molded of a suitable plastic material which is impervious to the material to be packaged in the container 10 and includes an upstanding nozzle portion 18 provided with an external thread 20 thereon. The member 14 may be conveniently be injection molded of nylon, which is found to be suitable for this purpose, and it includes a depending annular skirt portion 22 circumscribed by an annular groove 24. The member 14 is further provided with an annular flange 26 with is smoothly rounded at the outer edge 28 but which has a planar shoulder portion 30 adjacent to the groove 24 and against which the upper edge of the tube 12 abuts. The skirt portion 22 is surrounded by an annular plastic band 32 which is injection molded directly against the outer surface of the skirt 22 and into the groove 24.

In the illustrated embodiment of the invention, the tube 12 is formed of a two-ply material having an inner layer 34 of a plastic such as polyethylene, and an outer layer 36 of a metal such as aluminum. It will be understood that such materials will generally have a total wall thickness of approximately 7 mills, and therefore, that in this illustration the thickness of the tube material is oversized. Moreover, the tubular material will generally include several additional plies with the outer layer also being a plastic material. However, this is unimportant so far as the present invention is concerned inasmuch as it is the inner layer which must be sealed to the closure member 14.

The band 32 is molded of a plastic material which may be heat-sealed to the inner surface of the tube 12 and which can be molded to close dimensional tolerances. Accordingly, the band 32 may be formed of an ethyl vinyl acetate material such as E.V.A. which is sold by E. I duPont de Nemours & Co. It is important that the band 32 be injection molded directly against the skirt 22 so as to maintain the outer diameter of the band 32 within extremely close tolerances such, for example, as one-half of a mill. Moreover, since ethyl vinyl acetate shrinks or compresses slightly as it is cooled and sets up after molding, it firms a tight mechanical bond to the nylon against which it is molded. It will be understood that the material from which the band is molded must also have a melting point which is lower than that of the material from which the member 14 is molded since the member 14 functions as a portion of the mold cavity into which the band 32 is molded. For a more complete description of this method of injection molding one plastic part into another injection molded plastic part, reference may be had to copending application, Ser. No. 752,711, filed Aug. 14, 1968, by Eugene D. Shastal, entitled "Injection Molding Process" and assigned to the same assignee as the present invention.

With reference to FIG. 1, it may be seen that the flange portion 26 of the nozzle and closure member 14 extends beyond the outer surface of the tube 12 thereby to visually hide the seam between the upper edge of the tube 12 and the nozzle and closure member 14. If desired, the skirt portion 22 may be molded with a plurality of shallow annular grooves 38 whereby the band 32 will have complementary annular ribs which fit into these grooves 38 thereby to more positively secure the band 32 onto the member 10. In this embodiment of the invention, the cap 16 is molded separately from the remainder of the closure and is merely threadedly attached to the nozzle in the usual manner.

After the member 14 has been molded with the band 32 in place, the skirt 22 and associated band 32 are inserted into the upper end of the tube 12 until the upper edge of the tube abuts tightly against the shoulder portion 30. It is most important that a precise and tight fit be provided between the tube 12 and the skirt and band portion of the closure at the time of assembly, and therefore, in order to facilitate this assembly, the band 32 has a sharply tapered lower end 33 and a shallow draft molded thereon of, for example, 1½°. Thereafter, heat is locally applied to the upper end of the tube 12 and to the band 32 thereby to provide an annular weld or heat-seal between the band 32 and the plastic inner layer 34 of the tube. The cap 16 may then be threaded onto the nozzle portion 18 and the tube may thereafter be filled from the bottom with the contents to be packaged, and the tube thereafter folded and or sealed over at the bottom in any suitable manner.

Figure 3:
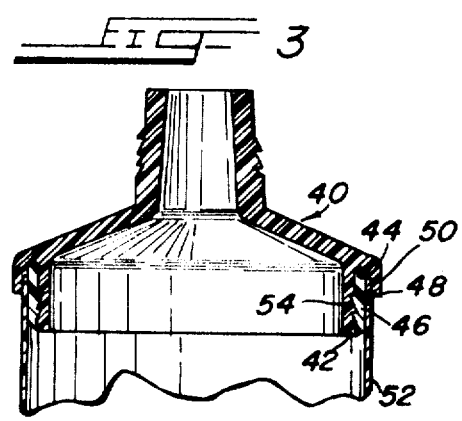
FIG. 3 is a fragmentary, sectional view of another embodiment of the present invention.

Referring to FIG. 3, there is shown another embodiment of the invention employing a nozzle and closure member 40 having a skirt portion 42 and an annular groove 44 circumscribing the skirt. The nozzle member 40 is preferably molded of an impervious plastic material such as nylon and an annular band 46 of a different plastic, such as E.V.A., is injection molded directly against the outer surface of the skirt and into the groove 44. Another groove 48 is provided in the closure alongside of the groove 44 between the band 46 and a depending flange portion 50. A plastic tube 52 is positioned around the skirt and extends into the groove 48. Thereafter, the band 46 is heat-sealed to the tube 32 in the same manner as the band 32 is heat-sealed to the tube 12 in the embodiment of FIG. 1. The outer surface of the skirt portion 42 is serrated when viewed in cross section as shown at 54 to more securely hold the plastic band 46 in place. This type of irregular surface may be required to hold the band 46 in place where the band 46 is formed of a plastic which does not shrink tightly onto the skirt 42 during molding.

Figure 4:
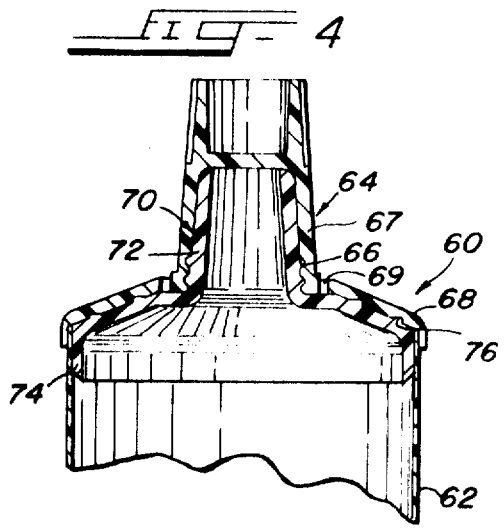
FIG. 4 is a fragmentary, sectional view of another embodiment of the present invention of the tamperproof type.

Referring now to FIG. 4, there is shown a container having a tamperproof closure 60. As there shown, a tube 62 formed of a multiple-ply material having a plastic inner layer is secured by heat-sealing to the closure 60. More particularly, the closure includes a unitary protective cover and cap member 64 formed of a rigid plastic material which is impervious to the material to be packaged in the container. This member 64 may conveniently be injection molded of nylon and is provided on its inner surface with an internally threaded portion 66. A cap portion 67 thereof is integral with a shoulder portion 68 and a plurality of slotted perforations 69 surround the cap portion 67 at the base thereof so that the tabs provided between the perforations and which connect the cap portion 67 to the shoulder portion 68 may be broken or fractured by rotating the cap 67 relative to the shoulder 68.

Injection molded directly into the member 64 is a plastic nozzle and sealing member 70 having an upstanding nozzle portion 72 which has external threads molded directly into the internal threads 66 on the inside of the member 64. In addition, the member 70 has a depending skirt portion 74 having a closely controlled OD and a shallow draft thereon which extends into the upper end of the tube 62. The member 70 is formed of a plastic material such, for example, as E.V.A. which may be heat-sealed to the plastic inner layer of the tube 62. In order to prevent spurious separation of the closure 64 from the nozzle member 72, a plurality of annular grooves 76 are molded into the inner surface of the member 64 so that the nozzle member 74 has complementary annular ribs which fit therein and aid in maintaining the parts in assembled relationship.

An advantage of the closure of FIG. 4 is that the entire closure piece may be molded in a two-step operation on a single machine, thereby substantially decreasing the cost of the overall assembly. In addition, the closure is tamperproof in that the cap 67 cannot be removed without breaking the integral tabs connecting it to the shoulder 68 which is fixed to the tube 62, thereby making it visibly apparent when the container has once been opened.

Figure 5:
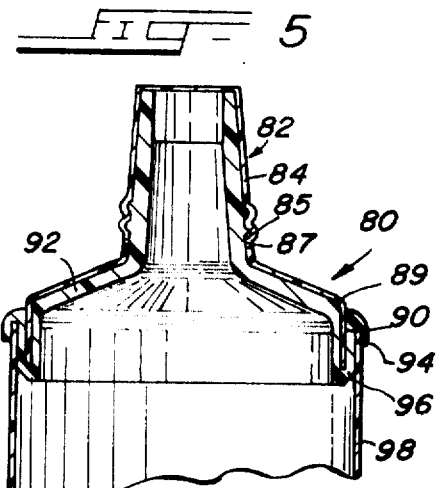
FIG. 5 is still another embodiment of the present invention of the tamperproof type.

FIG. 5 is another embodiment of the present invention, which includes a tamperproof closure 80 partially formed of metal and partially formed of plastic. There are some applications where metal provides the best protective seal for preventing loss of any of the ingredients from the material contained within the tube or from contamination of those ingredients by other materials penetrating the container. This embodiment of the invention may be used in such cases. As there shown, a protective cover and removable cap member 82 is formed of metal, such as aluminum, and the upper cap portion 84 is provided with internal threads 85. A plurality of perforations 87 surround the lower end of the cap portion 84 and separate it from a shoulder and sealing portion 89 having a skirt 90 imbedded into a nozzle member 92. The nozzle member 92 is plastic and is injection molded directly into the metal protective cover member 82 and around the skirt 90 thereby to fixedly secure the shoulder portion 89 of the closure in place to prevent spurious disassembly of the unit. An annular groove 94 is provided in the nozzle member 92 and surrounds a skirt portion 96 over which a tube 98 is positioned with the upper portion of the tube 98 fitting into the groove 94. The member 92 is formed of a plastic which may be heat-sealed to the inner plastic layer of the tube 98 and E.V.A. has been found to be suitable for this purpose. It will be noted that inasmuch as the member 92 is molded directly into the protective cover member 82 it will have an external thread mating with the internal thread 85 in the cover member.

While the present invention has been described in connection with particular embodiments thereof, it will be understood that those skilled in the art may make many changes and modifications without departing from the true spirit and scope of this invention, and accordingly all such changes and modifications which fall within the true spirit and scope of this invention are intended to be covered in the appended claims.

I claim:

1. A collapsible container for a fluid substance, comprising
   a tube formed of a multi-ply material with the inner wall of said tube formed of polyethylene,
   a closure member formed of nylon and having a nozzle portion and a depending skirt,
   a molded band of plastic material heat sealable to said polyethylene surrounding said skirt and fixed thereto,
   said tube being tightly fitted over said band with said inner wall engaging said band and heat-sealed thereto, and
   an annular shoulder on said closure member overlying and abutting the edge of said tube.
2. A container according to claim 1, wherein
   said plastic material contracts during setting
   and compresses the skirt portion of said closure member.
3. A container according to claim 2 wherein
   said closure member has an annular groove molded therein, and
   said band extends into said groove.
4. A container according to claim 3 wherein
   said tube extends into said groove in juxtaposition with said band.
5. An article of the type described, comprising
   a molded closure member having a nozzle portion at one end and a cylindrical skirt portion at the other end,
   an annular flange surrounding said skirt portion a substantial distance from the distal edge thereof, and
   said flange having an annular, cylindrical recess therein lying adjacent to said skirt portion and opening in the direction of the distal end of said skirt portion.
6. An article as set forth in claim 5 further comprising
   a flexible tube having a plastic inner surface overlying said skirt and bonded thereto,
   a portion of said tube extending into said recess,
   whereby the end of said tube adjoining said skirt is covered by said flange.
7. An article as set forth in claim 6 wherein
   said flange extends outwardly a substantial distance beyond the outer surface of said tube.
8. An article as set forth in claim 6 further comprising
   a molded plastic member interfitted with said closure member,
   said members having complementary adjoining surfaces to maintain said members in assembled relationship and being formed of different plastics,
   the plastic from which said closure member is formed being heat sealable to said plastic inner surface of said tube, and the plastic from which said molded plastic member is formed not being heat sealable to said plastic inner surface of said tube.

9. An article according to claim 5 wherein said closure member is formed of two parts with said annular recess extending therebetween.

10. An article according to claim 9 wherein one of said two parts is provided with an annular area of weakness dividing it into separable portions,
one of said portions being fixed to the other of said two parts and partially defining said annular recess, and
another of said portions being removably connect to said other of said two parts.